United States Patent
Fukuda

(10) Patent No.: US 6,181,520 B1
(45) Date of Patent: Jan. 30, 2001

(54) HEAD SLIDER AND DISK UNIT HAVING CONTACT DETECTION MEANS

(75) Inventor: Katsuyuki Fukuda, Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/041,168

(22) Filed: Mar. 12, 1998

(30) Foreign Application Priority Data

Jul. 4, 1997 (JP) .................................................. 9-179917

(51) Int. Cl.[7] .............................. G11B 5/48; G11B 33/10
(52) U.S. Cl. ................................. 360/244.1; 360/234.4; 360/47.02
(58) Field of Search .................................. 360/104, 106, 360/108, 97.02, 244.1, 234.4

(56) References Cited

U.S. PATENT DOCUMENTS

| | | | |
|---|---|---|---|
| 5,142,424 | * 8/1992 | Hatamura | 360/104 |
| 5,526,208 | * 6/1996 | Hatch et al. | 360/104 |
| 5,754,355 | * 5/1998 | Nakamura et al. | 360/75 |
| 5,757,573 | * 5/1998 | Tokuyama et al. | 360/104 |
| 5,808,837 | * 9/1998 | Norton | 360/105 |
| 5,862,015 | * 1/1999 | Evans et al. | 360/104 |
| 5,901,014 | * 5/1999 | Hiraoka et al. | 360/104 |

FOREIGN PATENT DOCUMENTS

| | | |
|---|---|---|
| 54-28610 | 3/1979 | (JP) . |
| 61-227220 | 10/1986 | (JP) . |
| 61-227221 | 10/1986 | (JP) . |
| 63-273205 | * 11/1988 | (JP) . |
| 1-91384 | 4/1989 | (JP) . |
| 1-319187 | * 12/1989 | (JP) . |
| 2-226560 | * 9/1990 | (JP) . |
| 4-065625 | * 3/1992 | (JP) . |
| 4-242132 | * 8/1992 | (JP) . |
| 6-60352 | 3/1994 | (JP) . |
| 8-17156 | 1/1996 | (JP) . |

* cited by examiner

Primary Examiner—Craig A. Renner
(74) Attorney, Agent, or Firm—Greer, Burns & Crain, Ltd

(57) ABSTRACT

A disk storage unit includes an electro-magnetic slider which has a contact detecting function. The unit includes a rotating recording disk, a slider body having a head for reading and writing information with respect to the recording disk, a suspension for supporting the slider body in such a manner that the slider body is opposed to the recording medium and flies above recording medium with a small gap therebetween owing to an air flow generated by a rotation of the recording disk. The suspension, on which the slider is mounted, has an electric resistance pattern formed on the suspension for detecting a strain generated on the resistance pattern when the slider body comes into contact with the disk recording medium.

10 Claims, 8 Drawing Sheets

WIRING PATTERN

LAND

HEAD SLIDER AND DISK UNIT HAVING CONTACT DETECTION MEANS

BACKGROUND OF THE INVENTION

1. Field of the Invention

The present invention relates to a structure of a head used for a disk storage unit such as a magnetic disk storage unit, magneto-optical disk storage unit and optical disk storage unit. More particularly, the present invention relates to a head slider and a disk storage unit having a function of detecting that a head comes into contact with a disk recording medium, in which the head flies above a surface of a rotating disk recording medium with a minute distance so that information can be read from the disk recording medium and also information can be written to the disk recording medium.

2. Description of the Related Art

Magnetic disk storage units have been used as external storage units for information processors. Recently, there has been a demand for an increase in the recording density of the magnetic disk storage unit in accordance with an increase in the quantity of information to be recorded. When information is recorded in a magnetic disk storage unit at high density, it is indispensable to operate the magnetic disk storage unit in such a manner that a magnetic recording head rises a minute distance above a recording medium. Further, it is necessary that the magnetic recording head is made to slide on the recording medium under the condition that a very light load is given to the recording medium by the magnetic recording head.

In a magnetic recording head structure, as a load given to the recording medium by the magnetic recording head is very small and the size of the structure is reduced, there has been proposed a micro-contact type thin film magnetic recording head which is a thin film magnetic recording head assembling body in which a thin film magnetic recording head is combined with an elastic supporting member. In this micro-contact type thin film magnetic recording head, there are provided an electro-magnetic transducer having a medium contact surface formed by the thin film forming technique, and a long slender plate-shaped flexible supporting body having a signal lead pattern and supporting the electro-magnetic conversion element section.

This micro-contact type thin film magnetic recording head is very small, and it is difficult to make the medium contact surface of the electro-magnetic transducer come into contact with the recording medium surface in a good contacting and sliding condition. Accordingly, there is a tendency that the recording and regenerating characteristic of the thin film magnetic recording head is deteriorated. For the above reasons, there is a necessity for a micro-contact type thin film magnetic recording head which can be easily controlled in such a manner that the medium contact surface of the electro-magnetic transducer contacts with the recording medium surface in a good contacting and sliding condition.

A support mechanism for the conventional magnetic recording head includes: a slider on which the magnetic recording head is mounted; a suspension for holding the slider; a load beam for holding the suspension; and a spacer for holding the load beam. The load beam is composed of a rigid portion and an elastic portion. The elastic portion of the load beam is subjected to machining referred to as "R-bending" so that a load can be generated by the elastic portion in order to urge the slider against the recording medium. Due to the above arrangement, the slider can be urged against the recording medium with a predetermined force. When the recording medium (magnetic storage disk) is rotated in the recording and regenerating mode, the load given to the slider is counter-balanced by a rising force generated by an air flow on the slider surface. Therefore, the slider can rise above the recording medium while a minute or small gap is maintained between the slider and the recording medium.

When the recording density is increased in the conventional magnetic recording head structure described above, it is necessary to reduce the distance from the disk recording medium to the magnetic recording head slider to as small as possible. On the other hand, although the surface of the disk recording medium is smoothed by machining such as mirror surface machining, there are minute protrusions and irregularities. When the heights of these protrusions and irregularities exceed an allowable range, the magnetic recording head slider collides with the recording medium surface of the disk in the seeking operation.

In order to solve the above problems, the conventional magnetic recording head slider is provided with a detecting means for detecting contact between the magnetic recording head slider and the disk recording medium. For example, a piezo-electric element is attached onto a side of the magnetic recording head slider, and a shock caused in the contact of the magnetic recording head slider with the disk recording medium is detected by the piezo-electric element, so that the shock can be picked up in the form of an electric signal. When the contact of the magnetic recording head slider with the disk recording medium is detected in this way, an intense collision of the magnetic recording head with the disk recording medium can be avoided, and data recorded on the recording medium can be safely stored.

However, in accordance with the progress of the magnetic disk storage unit, the recording density of which is highly increased, the size of the magnetic recording head slider is reduced. Therefore, it becomes difficult to ensure a sufficiently large space to attach the piezo-electric element used for detecting contact between the magnetic recording head and the recording medium.

Japanese Examined Patent Publication No. 6-80577 discloses the following technique. An AE (acoustic emission) sensor is attached to the magnetic recording head. When an elastic wave of strain energy generated in the contact of the magnetic recording head with the disk recording medium surface is emitted in the form of a sound (ultrasonic wave), the acoustic emission sensor detects this sound. However, the following problem may be encountered in this technique. The sensitivity of the acoustic emission sensor is very high and, therefore, a sound emitted in a case other than the collision of the magnetic recording head with the recording medium surface is detected in some cases. In other words, unlike a strain sensor, it is difficult to detect only a physical shock by this acoustic emission sensor.

SUMMARY OF THE INVENTION

It is an object of the present invention to provide a recording head structure having a function for detecting contact of the slider with the recording medium even if the size of the slider is reduced in accordance with the size of the disk storage unit.

Another object of the present invention is to provide a head slider and a disk unit having contact detecting means which can solve the above-mentioned problems.

According to the present invention, there is provided a disk storage unit having a contact detecting means, the unit comprising: a rotating disk recording medium; a slider having a head for reading and writing information with respect to the recording medium; means for supporting the slider in such a manner that the slider is opposed to the recording medium and flies above the recording medium with a small gap therebetween due to an air flow generated by the rotation of the recording medium; and the supporting means comprising a suspension on which the slider is mounted, and an electric resistance pattern formed on the suspension for detecting a strain generated on the resistance pattern when the slider comes into contact with the disk recording medium.

The electric resistance pattern may be formed on a surface of the suspension on which the slider is mounted. The electric resistance pattern may also be formed on a second surface of the suspension opposite to a first surface thereof on which the slider is mounted.

The electric resistance pattern can be formed simultaneously when the suspension is formed. The electric resistance pattern may comprise an electric resistance film adhered to a surface of the suspension.

A wiring portion of the electric resistance pattern and another wiring portion electrically connected to terminals of the slider can be formed on the suspension.

According to another aspect of the present invention, there is provided an electro-magnetic head slider comprising: a slider body having a head for reading and writing information with respect to a rotating recording medium; means for supporting the slider body in such a manner that the slider body is opposed to the recording medium and flies above the recording medium with a small gap therebetween owing to an air flow generated by the rotation of the recording medium; and an electric resistance pattern formed on the slider body for detecting a strain generated on the resistance pattern when the slider body comes into contact with the disk recording medium.

The slider body may have an end surface of an air outflow side thereof with respect to the direction of movement thereof with respect to the rotating recording medium and the electric resistance pattern is formed on the end surface of the slider body.

The slider body may have side surfaces thereof with respect to the rotating recording medium and the electric resistance pattern is formed on at least one of the side surfaces of the slider body. The electric resistance pattern is formed at an inside position of the slider body.

According to still another aspect of the present invention, there is provided an electro-magnetic head slider comprising: a rotating disk recording medium; a slider body having a head for reading and writing information with respect to the recording medium; means for supporting the slider body in such a manner that the slider body is opposed to the recording medium and flies above the recording medium with a small gap therebetween owing to an air flow generated by the rotation of the recording medium; and an electric resistance pattern formed on the slider body for detecting a strain generated on the resistance pattern when the slider body comes into contact with the disk recording medium; and the slider body having a wiring portion of the electric resistance pattern and another wiring portion electrically connected to terminals of the slider body, the wiring portion being electrically connected to terminals of the slider body.

A contact detecting MR element having substantially the same structure as the head element may be used. Such a MR element is formed on the slider body for detecting a thermal asperity generated on the slider body when the slider body comes into contact with the disk recording medium. In this connection, the slider body may have a wiring portion electrically connected to terminals of the MR element, the wiring portion being formed on the suspension on which the slider body is mounted.

A thermo-couple may also be used. Such a thermo-couple may be formed at an inside position of the slider body for detecting a strain generated on the slider body when the slider body comes into contact with the disk recording medium. In this connection, the slider body may have a wiring portion of the thermo-couple and another wiring portion electrically connected to terminals of the slider body, the wiring portions being formed on the suspension on which the slider body is mounted.

DETAILED DESCRIPTION OF THE PREFERRED EMBODIMENTS

Referring to the accompanying drawings, some embodiments of the present invention will be explained in detail as follows.

Figure 1:
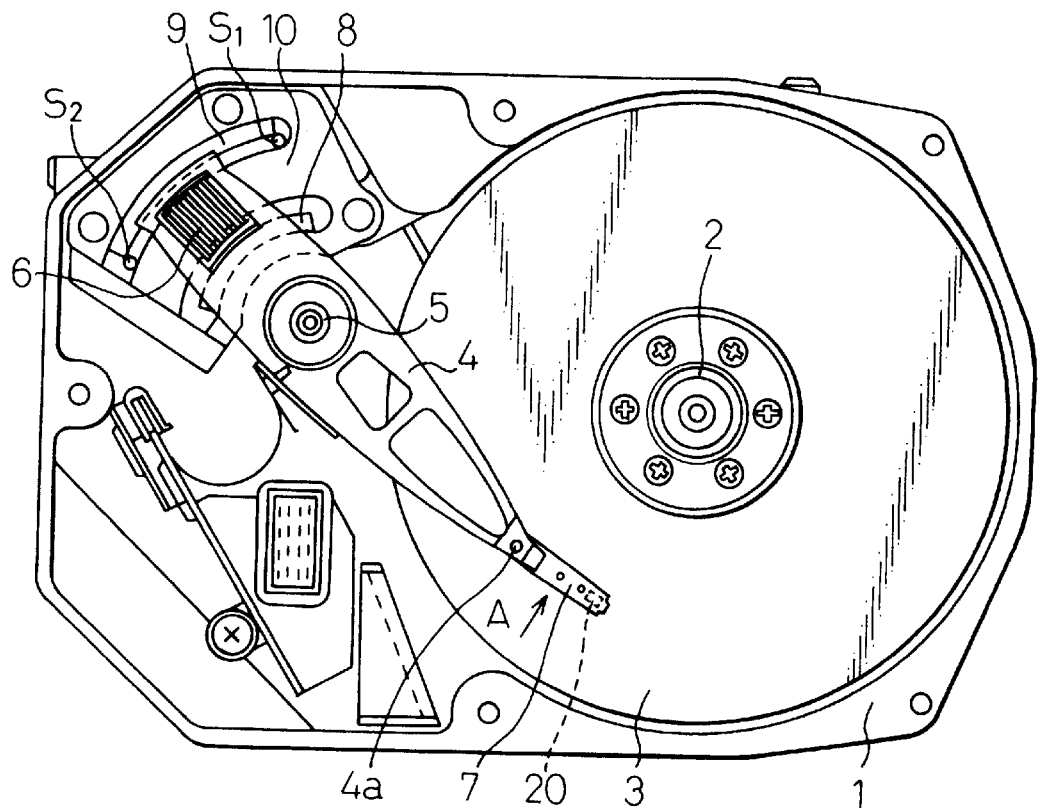
FIG. 1 is a plan view of a magnetic disk storage unit to which the present invention can be applied, wherein this view shows a state of the magnetic disk storage unit from which an upper cover is removed.
Figure 2:
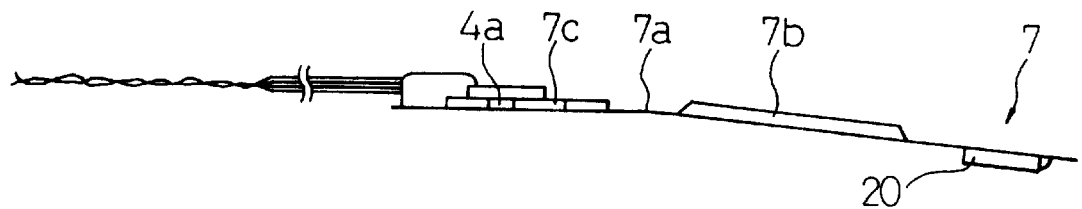
FIG. 2 is an enlarged view taken in the direction of arrow "A" in FIG. 1, wherein a head slider section and a supporting section of the magnetic disk storage unit are shown in this view.

In FIGS. 1 and 2, there is vertically provided a spindle 2 rotated by a spindle motor (not shown) on the base of the disk enclosure 1. A plurality of magnetic disks 3 are attached to the spindle 2 in such a manner that they are stacked on each other at regular intervals.

A head arm 4 is pivoted to the shaft 5 on the base of the disk enclosure 1. A coil 6 is attached to one rotating end portion of the head arm 4, and a magnetic recording head slider 20 is attached to the other rotating end portion of the head arm 4 via a suspension 7. In this connection, the coil 6 is arranged in a magnetic gap of a magnetic circuit formed by the magnets 8, 9 and yoke 10.

The magnetic recording head slider 20 is tiltably attached to a flexure portion formed at a front end portion of the suspension 7 as shown in FIG. 2. In this connection, there is provided an elastic portion 7a, which is subjected to R-bending so that it can be bent, only at the base end portion of the suspension 7. There is provided a flange 7b on the side of the intermediate portion of the suspension 7, so that the rigidity of the suspension 7 can be enhanced, wherein the flange 7b is formed by folding. A base end portion 7c of the suspension 7 to which the magnetic recording head slider 20 is attached is engaged with an attaching hole 4a of the head arm 4 of the magnetic disk storage unit. The suspension 7 is attached to the head arm 4 so that the magnetic recording head slider 20 can be urged against the magnetic disk 3 by a force of the elastic portion 7a and a predetermined spring force can be impressed upon the magnetic disk 3.

Movement of the head arm 4 is restricted by inner stopper $S_1$ and outer stopper $S_2$, so that the head arm 4 can be moved in the direction A (and back) between both stoppers. Accordingly, the magnetic recording head slider 20 is moved on the magnetic disk 3 from an inner diameter position to an outer diameter position in a movement range restricted by both stoppers $S_1$ and $S_2$.

Figure 3:
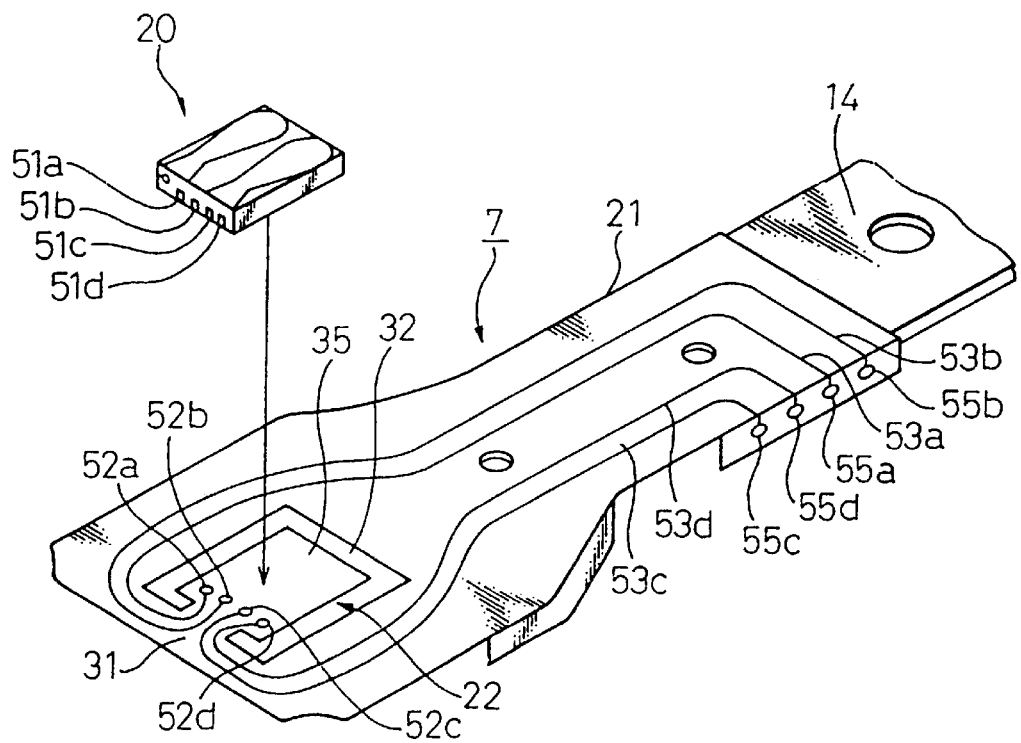
FIG. 3 is a view showing a mounting portion of the suspension on which the magnetic recording head is mounted.

FIG. 3 is a view showing a supporting mechanism of the magnetic recording head slider 20. The suggestion 7 is fixed to a spacer 14 of the head arm. The suspension 7 is composed of a slider mounting portion, which is formed as a gimbal portion 22, and a load beam 21, and the slider mounting portion and load beam 21 are formed by one integrated sheet member. In this case, it is appropriate to use stainless steel (SUS) as the sheet member. Thickness of the sheet member is approximately 25 µm. The gimbal portion 22 is integrally formed by an opening in a portion of the load beam 21 close to the front end portion. That is, the substantially rectangular gimbal portion 22 is connected to the load beam 21 only at the central portion 31 on the front side of the gimbal portion 22. The periphery of the gimbal portion 22 is cut off from the load beam 21 by a substantially C-shaped opening 32. Due to the above structure, the gimbal portion 22 is allowed to move the directions of rolling and pitching with respect to the load beam 21.

That is, the gimbal portion 22 can be deformed in the rolling and the pitching direction with respect to the load beam 21 round the connection section 31 of the gimbal portion 22 with the load beam 21 by the elastic deformation of the connecting section 31.

The size a×b of the slider fixing portion 35, which is a primary portion of the gimbal portion 22, is sufficiently large for fixing the magnetic recording head slider 20, for example, the size a×b of the slider fixing portion 35 corresponds to the outside dimension (a=2 mm and b=1.6 mm) of the magnetic recording head slider 20. However, as long as the adhesive strength is sufficiently high, this outside dimension may be reduced. In order to ensure the reliability of the apparatus, the weight of the magnetic recording head slider is preferably small. The back side of the slider opposite to the flying surface is flat and fixed to the fixing portion 35 with adhesive. In this case, the center of the slider is made to coincide with the center of the fixing portion 35.

The wiring pattern to be connected to the magnetic recording head slider 20 is arranged as follows. In FIG. 3, reference numerals 51a to 51d are terminals of the magnetic recording head slider 20; reference numerals 52a to 52d are terminals of the head mounting portion 35 on the load beam 21 side to be connected to the terminals 51a to 51d; reference numerals 53a to 53d are wiring patterns formed on the load beam 21; and reference numerals 55a to 55d are terminals to be connected to the outside of the load beam 21.

Figure 4:
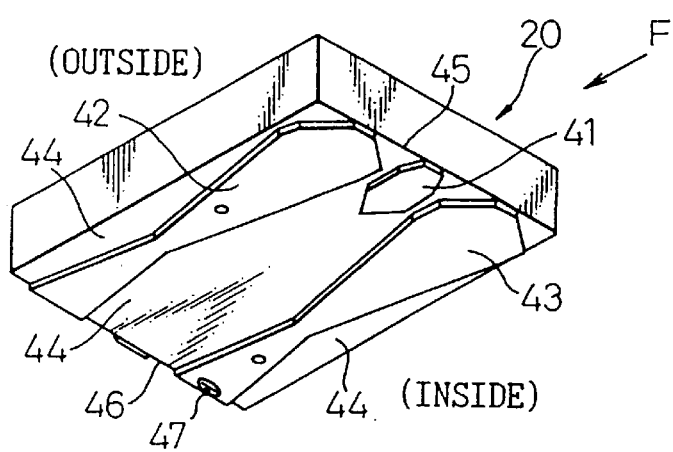
FIG. 4 is a perspective view showing the magnetic recording head slider, wherein this view is taken from the side opposed to the magnetic disk (not shown)

FIG. 4 is a perspective view of the magnetic recording head slider 20, wherein this view is taken from the side opposed to the magnetic disk. In this view, reference numerals 41, 42, 43 are rails, reference numeral 44 is a groove, reference numeral 45 is an inflow end, reference numeral 46 is an outflow end, and reference numeral 47 is an electromagnetic conversion element (MR element). The rail 41 is arranged at the center of the inflow end 45 of the magnetic recording head slider 20. A pair of rails 42, 43 arranged on both sides of the rail 41 extend from the inflow end 45 side to the outflow end 46 side.

When the magnetic disk 2 shown in FIG. 1 is rotated and air flows into the magnetic recording head slider 20, a force to separate the magnetic recording head slider 20 from the magnetic disk 3 is generated on the flying surfaces of the rails 41, 42, 43. At the same time, air which has flowed in the direction F from the inflow end 45 side expands into the groove 44. Therefore, a negative pressure is generated to suck that magnetic recording head slider 20 onto the magnetic disk 3 side. Accordingly, the magnetic recording head slider 20 is raised from the magnetic disk 3 to a height at which forces from both sides counter-balance each other. In this case, the forces include not only the raising force and the sucking force generated by the air current but also the spring force generated by the suspension 7.

When swelling occurs on the rotating magnetic disk 3 or dust adheres to the rotating magnetic disk 3, the magnetic recording head slider 20 is rotated in the direction of pitching, and the connecting portion 31 of the gimbal portion 22 with the load beam 21 is being bent. The magnetic recording head slider 20 is also rotated in the direction of rolling. As described above, the magnetic recording head slider 24 is supported by the gimbal portion 22 of the suspension 7 so that it can elastically oscillate in both the pitching and the rolling directions.

Figure 5:
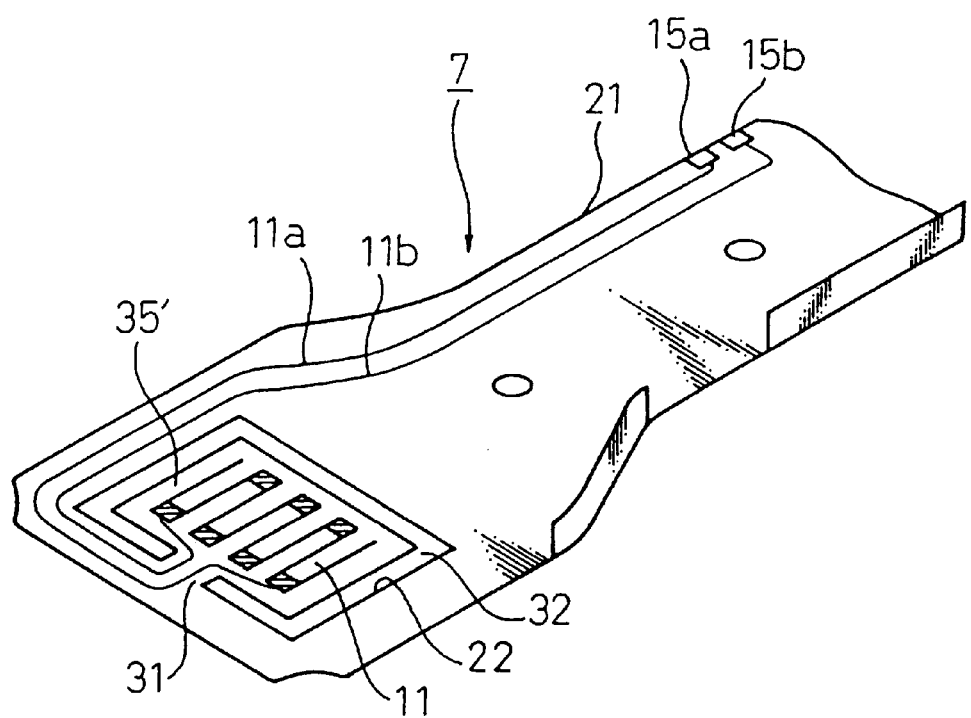
FIG. 5 is a perspective view showing the first embodiment of the head structure having a contact detecting function of the present invention.

FIG. 5 is a perspective view showing the first embodiment of the present invention. In this embodiment, there is provided a resistance pattern 11 on the back side 35' of the slider mounting portion 35 of the gimbal portion 22 of the suspension 7. In the case where the magnetic recording head slider 20 comes into contact with the magnetic disk 3, a strain caused in this slider 20 is detected by the resistance pattern 11. In this connection, the electric wires 11a, 11b of the resistance pattern 11 are formed on the surface opposite to the surface on which the electric wires 53a to 53d shown in FIG. 3 of the magnetic recording head slider 20 are formed, and the end portions are connected to the terminals 15a, 15b.

In this embodiment, the resistance pattern 11, which acts as a strain gauge, is provided on the back side of the suspension 7 which is opposite to the side on which the slider is mounted. However, in the case where no wiring pattern connected to the magnetic recording head slider 20 is provided on the surface of the suspension 7 as shown in FIG. 3, the resistance pattern 11 may be provided on the same side on which the magnetic recording head slider 20 is mounted. The resistance pattern 11 may be formed on the surface of the suspension 7 in the process of forming the suspension 7. Alternatively, the resistance pattern 11 may be composed of a resistance film adhering onto the surface of the suspension 7.

When the magnetic recording head slider 20 comes into contact with the surface of the magnetic disk 3, a minute strain is caused in the suspension 7, especially in the head mounting portion 35. This strain is detected by the resistance pattern 11, and the electric signal of the strain is sent through the wiring patterns 11a, 11b and the terminals 15a, 15b to an appropriate circuit, not shown in the drawing, so that the electric signal can be amplified. In this way, the contact of the magnetic recording head slider 20 with the magnetic disk 3 can be electrically detected.

Figure 6:
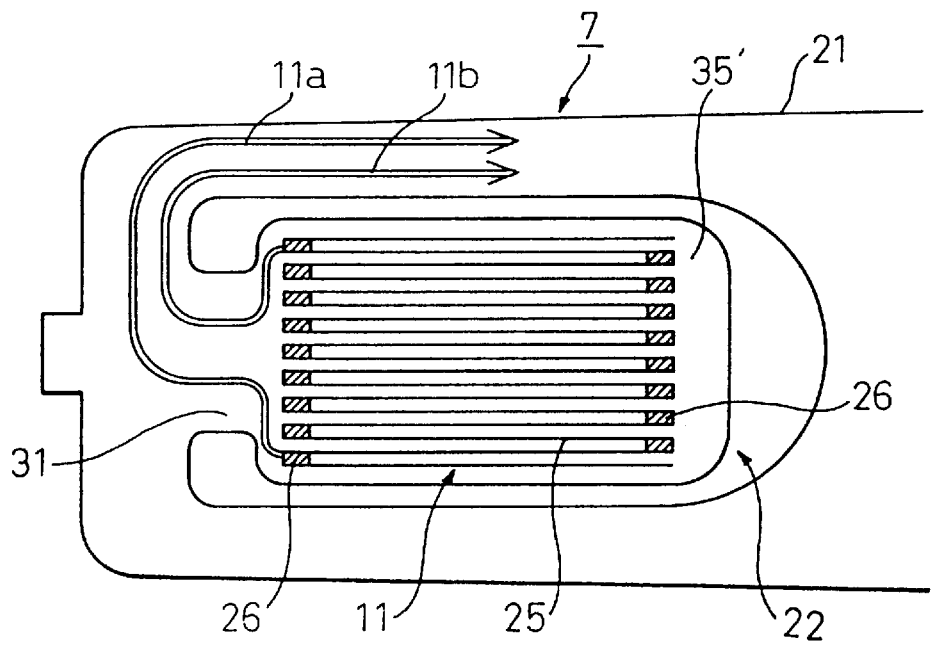
FIG. 6 is a plan view showing a detail of the resistance pattern used as a strain sensor.
Figure 7A:
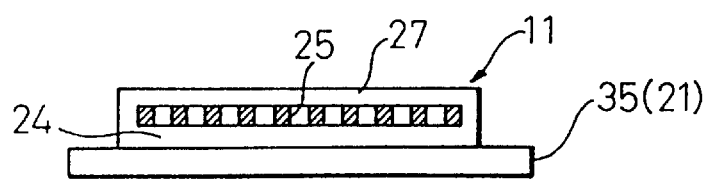
FIGS. 7(*a*) and 7(*b*) are cross-sectional and plan views showing an outline of the resistance pattern.
Figure 7B:
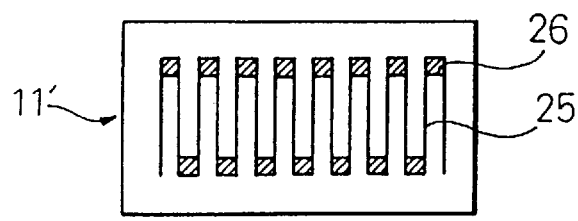

FIG. 6 is a plan view showing the resistance pattern 11 in detail. FIG. 7(a) is a cross-sectional view showing an outline of the resistance pattern 11, and FIG. 7(b) is a plan view showing an outline of the film-shaped resistance pattern. It is preferable that the resistance pattern 11 acting as a strain gauge is made of CuNi (copper.nickel) alloy, the change in the electric resistance of which is high in the elastic limit when it is deformed. The electric pattern 11 may be formed by the method of the thin film process or adhesion of a film-shaped resistance pattern.

According to the method of the thin film process, a polyimide film 24, which is an insulating film, is formed on the back surface 35' of the slider mounting portion of the suspension 7; a large number of steel wire patterns 25 made of CuNi alloy are formed on the polyimide film 24 in parallel with each other; and the terminals are formed into a zigzag shape by bonding with gold balls 26. On the pattern 25, there is provided a polyimide film 27 to be used as a protective film.

Essentially, the film-shaped resistance pattern 11' has the same structure. As shown in FIG. 7(b), there are provided parallel patterns 25 made of CuNi alloy which are bonded with gold bumps 26. These patterns 25 are previously formed into a film-shape. These film-shaped patterns are made to adhere onto the back side 35' of the slider mounting portion with an appropriate adhesive agent for polyimide.

Figure 8A:
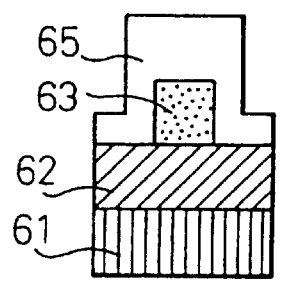
FIGS. 8(*a*) and 8(*b*) are cross-sectional views showing a wiring pattern and a land portion.
Figure 8B:
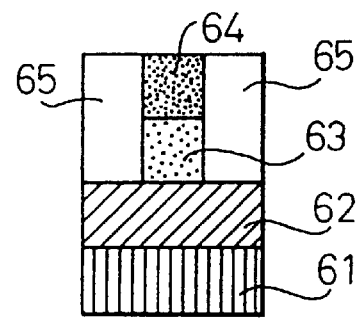

FIG. 8(a) is a cross-sectional view showing an outline of the wiring pattern 53a to 53d (shown in FIG. 3) and 11a, 11b (shown in FIG. 5) which are laminated on the suspension 21 of the magnetic disk storage unit by the thin film process, and FIG. 8(b) is a cross-sectional view showing an outline of the terminals (land portions) 52a to 52d (shown in FIG. 3) which are laminated on the suspension 21 of the magnetic disk storage unit by the thin film process. As illustrated in the drawing, for example, a substrate insulating film 62 of polyimide is formed by the spin-coating method on the base plate 61 of the suspension 21 made of stainless steel of SUS, and then a conductor 63 made of material such as Cu is formed on the substrate 62 by a sputtering method or a vapor-deposition method. In the case of forming a wiring pattern, an upper protective film 65 of polyimide is formed by the spin-coating method on the conductor film 63, so that the conductor film 63 can be covered. In the formation of the land portion, a pad layer 64 of Au is formed on the conductor 63 by a sputtering method or a vapor-deposition method, and an upper protective film 65 is formed by the spinning coating method and the pad layer 64 is exposed onto the upper side.

Figure 9:
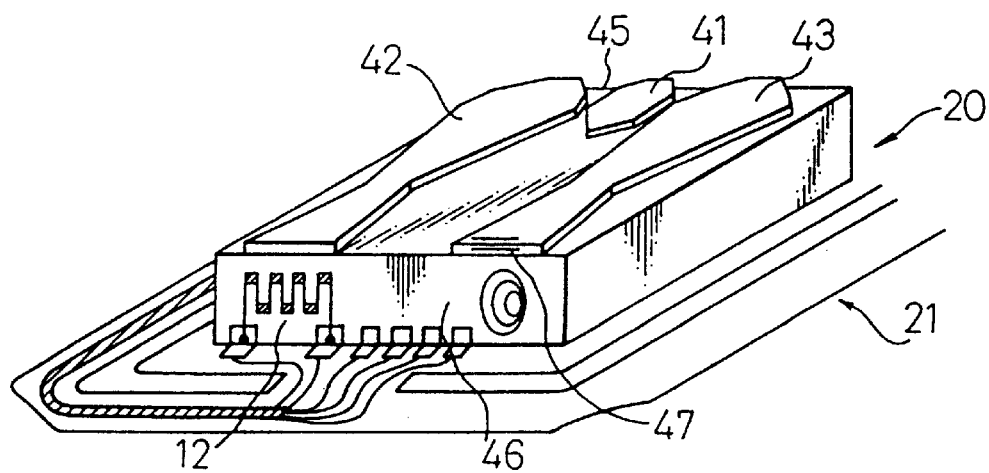
FIG. 9 is a perspective view showing the second embodiment of the head structure having a contact detecting function of the present invention.

FIG. 9 is a perspective view of the magnetic recording head slider showing the second embodiment of the present invention. In this embodiment, there is provided a resistance pattern 12 on an end surface on the outflow end 46 side with respect to the moving direction of the magnetic disk 3 of the magnetic recording head slider 20, and the strain on the slider caused by the contact of the magnetic recording head slider 20 with the magnetic disk 3 is detected by the resistance pattern 12. This embodiment is preferable when strain is detected in the rolling direction of the magnetic recording head slider 20. In this connection, four land portions on the suspension 21 side connected to the terminals of the magnetic recording head slider 20 and their wiring sections are formed on the same surface of the suspension 21 by the thin film process in the same manner as that described before. Also, two land portions connected to the terminals of the resistance pattern 12 and their wiring sections are formed on the same surface of the suspension 21 by the thin film process.

Figure 10:
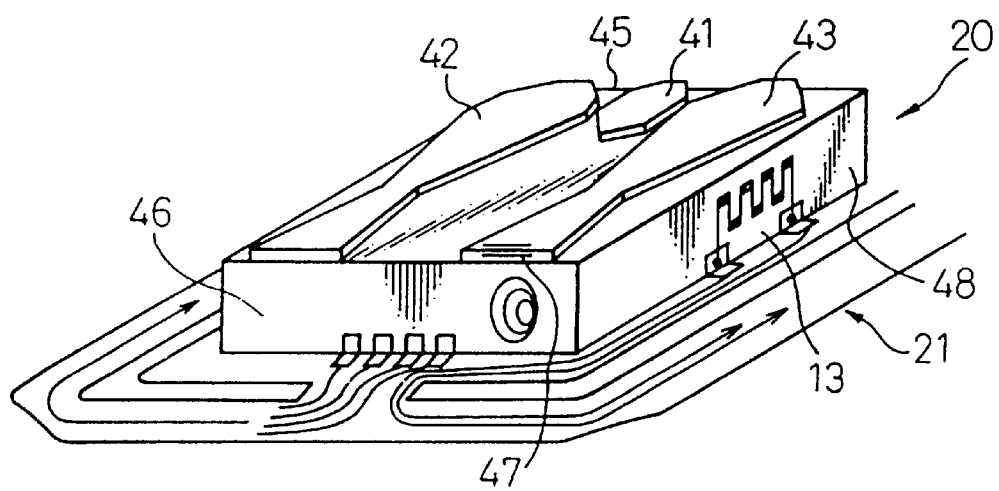
FIG. 10 is a perspective view showing the third embodiment of the head structure having a contact detecting function of the present invention.

FIG. 10 is a perspective view of the magnetic recording head slider showing the third embodiment of the present invention. In this embodiment, there is provided a resistance pattern 13 on the side 48 with respect to the moving direction of the magnetic disk 3 of the magnetic recording head slider 20. In the same manner as that of the embodiment shown in FIG. 6, strain on the slider caused when the magnetic recording head slider 20 comes into contact with the magnetic disk 3 is detected by this resistance pattern 13. This embodiment is preferable when strain is detected in the pitching direction of the magnetic recording head slider 20. In this connection, the land portion and the wiring portion can be composed in the same manner as that of the second embodiment.

Figure 11:
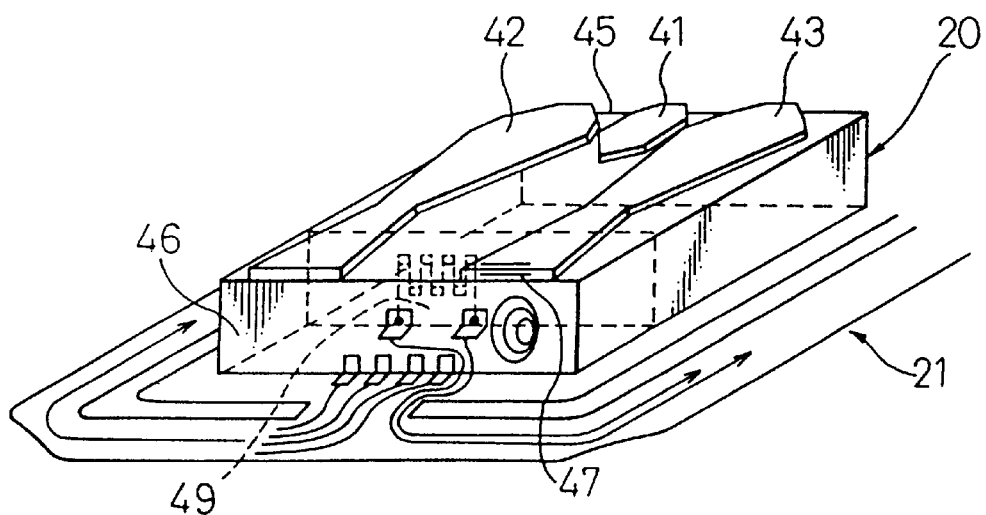
FIG. 11 is a perspective view showing the fourth embodiment of the head structure having a contact detecting function of the present invention.

FIG. 11 is a perspective view of the magnetic recording head slider showing the fourth embodiment of the present invention. In this embodiment, there is provided a resistance pattern 49 inside the magnetic recording head slider 20. The resistance pattern 49 is arranged in a direction perpendicular to the moving direction of the magnetic disk 3 in the same manner as that of the second embodiment shown in FIG. 9. Therefore, strain in the rolling direction of the magnetic recording head slider 20 can be easily detected. In this connection, the land portion and the wiring portion can be formed in the same manner as that of the embodiment described before.

Figure 12A:
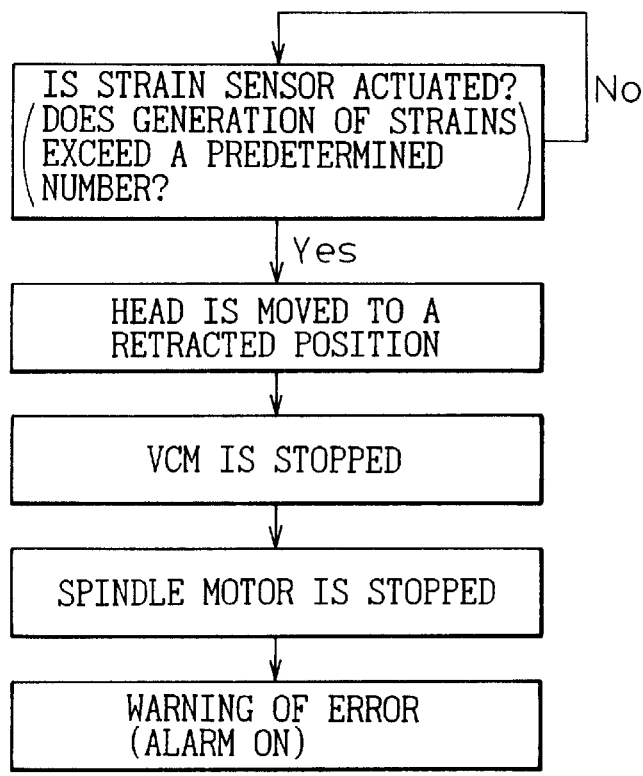
FIGS. 12(*a*) and 12(*b*) are flow chart of control and block diagram showing an essential structure of the control section.
Figure 12B:
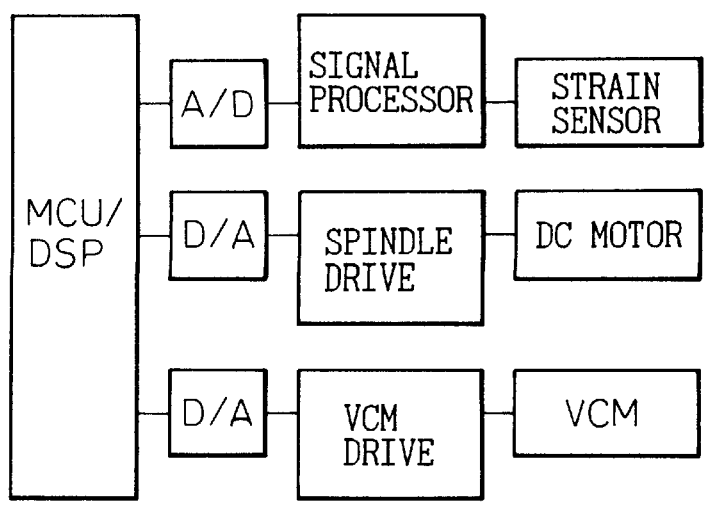

FIG. 12(a) is a flow chart and FIG. 12(b) is a block diagram of the essential structure of the control section when the resistance patterns 11, 12, 13 and 49 are used as strain sensors as shown in the first to the fourth embodiment so that the contact of the magnetic recording head slider 20 with the magnetic disk 3 can be detected. An abnormal contact of the magnetic recording head (slider) with the magnetic disk is detected by the strain sensor, and the drive of the disk storage unit is stopped. It has been found that the magnetic recording head comes strongly into contact with the magnetic disk after the magnetic recording head has come into contact with the magnetic disk several times, and then the magnetic disk slider starts rubbing the magnetic disk. For the above reasons, it is necessary to stop the drive of the disk storage unit at the initial stage of contact before the magnetic recording head comes strongly into contact with the magnetic disk.

Consequently, as shown in FIGS. 12(a) and 12(b), when the strain sensor detects strain and the number of detections of strain reaches a predetermined value, first, the magnetic recording head (slider) is moved to a retracting zone by a voice coil motor (VCM), and then the voice coil motor (VCM) is stopped. Next, the spindle (DC) motor is stopped, so that the operation of the disk storage unit is stopped, and an error report (alarm occurrence) is made and the operator is informed of the error.

Figure 13:
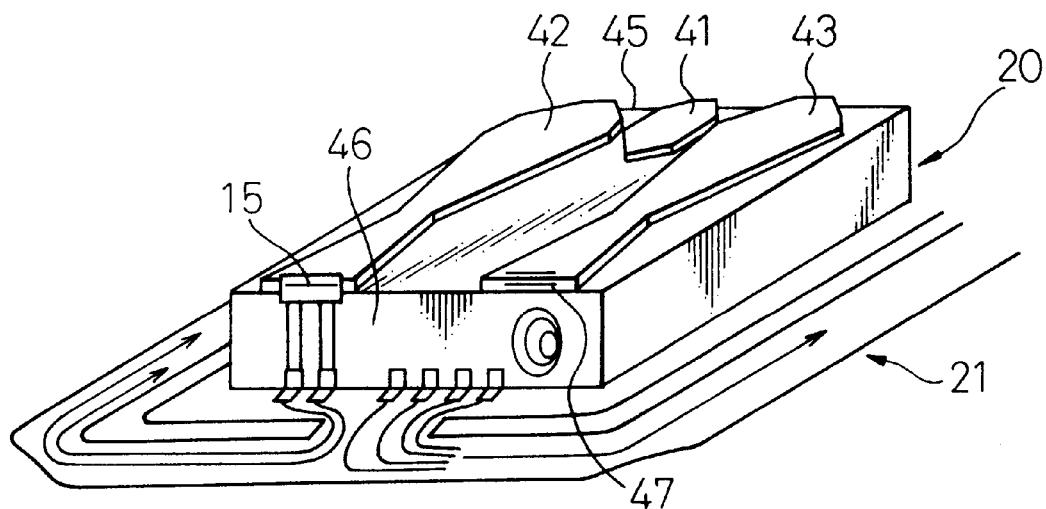
FIG. 13 is a perspective view showing the fifth embodiment of the head structure having a contact detecting function of the present invention.

FIG. 13 is a perspective view of the magnetic recording head slider showing the fifth embodiment of the present invention. In this embodiment, there is provided MR element 15 exclusively used for detecting a contact, and this MR element 15 has the same structure as that of the magnetic transducer 47 composed of an MR element. That is, the magnetic transducer 47 is arranged at a position close to the outflow end of one rail 43, and MR element 15 exclusively used for detecting a contact is arranged at a position close to the outflow end of the other rail 42, so that the thermal asperity caused in the magnetic recording head slider in the contact with the magnetic disk can be detected. Due to the foregoing, the contact can be detected in this embodiment.

Figure 14:
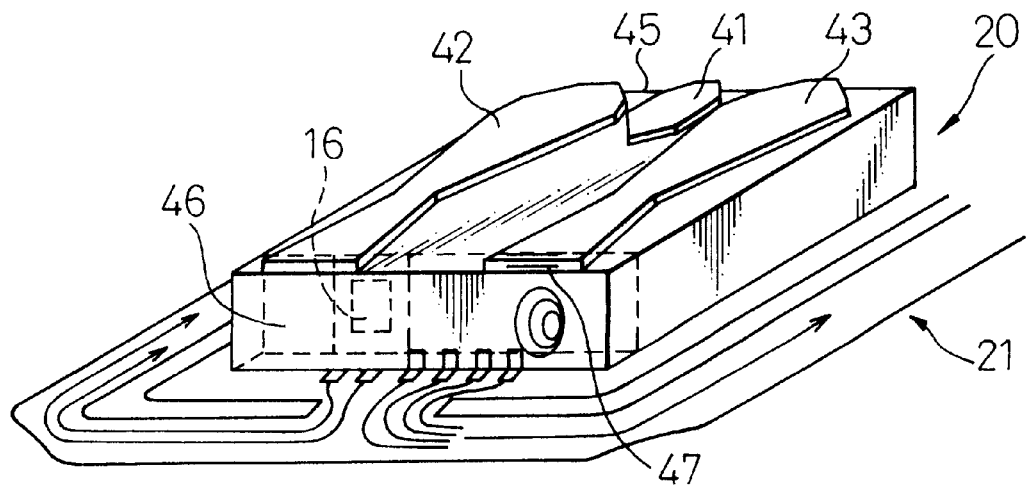
FIG. 14 is a perspective view showing the sixth embodiment of the head structure having a contact detecting function of the present invention.

FIG. 14 is a perspective view of the magnetic recording head slider showing the sixth embodiment of the present invention. In this embodiment, there is provided a thermo-couple 16 in the magnetic recording head slider 20, and a change in the temperature caused in the magnetic recording head slider 20 is detected by the thermo-couple 16 when the magnetic recording head slider 20 comes into contact with the magnetic disk. Due to the foregoing, the contact can be detected. In this connection, the land portion and the wiring portion can be composed in the same manner as that of the fifth and the sixth embodiments.

In the above explanations, referring to the accompanying drawings, several preferred embodiments to illustrate the present invention are described. However, it should be noted that the present invention is not limited to the above specific embodiments, ad variations may be made by one skilled in the art without departing from the spirit and scope of the invention. For example, although a magnetic disk storage unit is described in the above embodiment, it is possible to apply the present invention to a optical-magnetic disk storage unit or a optical-disk storage unit.

As explained above, according to the present invention, even if the size of a slider is reduced in accordance with the developments of a disk storage unit, the recording density of which is highly increased, when a resistance pattern or other minute elements are arranged in the suspension or the slider, it is surely possible to detect that the slider comes into contact with the recording medium.

What is claimed is:

1. A suspension assembly comprising
   a slider adapted to fly above a recording medium with a small gap therebetween due to an air flow generated by rotation of the recording medium,
   a suspension on which the slider is mounted, and
   an electrical resistance pattern for detecting a strain generated in said resistance pattern when said slider comes into contact with the recording medium;
   wherein said electrical resistance pattern is attached at a position where said slider is mounted and said slider is mounted on said electrical resistance pattern.

2. The suspension assembly of claim 1, wherein said electric resistance is simultaneously formed when said suspension is formed.

3. The suspension assembly of claim 1, wherein said electric resistance pattern comprises an electric resistance film adhered to a surface of said suspension.

4. The suspension assembly of claim 1, wherein a wiring portion of said electric resistance pattern and another wiring portion electrically connected to terminals of the slider are formed on said suspension.

5. A suspension assembly comprising
   a slider adapted to fly above a recording medium with a small gap therebetween due to an air flow generated by rotation of the recording medium,
   a suspension on which the slider is mounted, and
   an electric resistance pattern for detecting a strain generated in said resistance pattern when said slider comes into contact with the recording medium;
   wherein said electric resistance pattern is formed on a second surface of said suspension opposite to a first surface thereof on which said slider is mounted at a position corresponding to the position of said electric resistance pattern.

6. A disk storage unit having a contact detecting means, said unit comprising:
   a rotating disk recording medium;
   a slider having a head for reading and/or writing information with respect to said recording medium;
   means for supporting said slider in such a manner that said slider is opposed to said recording medium and flies above said recording medium with a small gap therebetween due to an air flow generated by a rotation of said recording medium; and
   said supporting means comprising a suspension on which said slider is mounted, and an electric resistance pattern for detecting a strain generated in said resistance pattern when said slider comes into contact with said disk recording medium;
   wherein said electric resistance pattern is attached at a position where said slider is mounted and said slider is mounted on said electric resistance pattern.

7. A disk storage unit as set forth in claim 6, wherein said electric resistance pattern is simultaneously formed when said suspension is formed.

8. A disk storage unit as set forth in claim 6, wherein said electric resistance pattern comprises an electric resistance film adhered to a surface of said suspension.

9. A disk storage unit as set forth in claim 6, wherein a wiring portion of said electric resistance pattern and another wiring portion electrically connected to terminals of said slider are formed on said suspension.

10. A disk storage unit having a contact detecting means, said unit comprising:
   a rotating disk recording medium;
   a slider having a head for reading and/or writing information with respect to said recording medium;
   means for supporting said slider in such a manner that said slider is opposed to said recording medium and flies above said recording medium with a small gap therebetween due to an air flow generated by a rotation of said recording medium; and
   said supporting means comprising a suspension on which said slider is mounted, and an electric resistance pattern for detecting a strain generated in said resistance pattern when said slider comes into contact with said disk recording medium;
   wherein said electric resistance pattern is formed on a second surface of said suspension opposite to a first surface thereof on which said slider is mounted at a position corresponding to the position of said electric resistance pattern.

* * * * *